United States Patent

Schroter

[15] 3,666,060
[45] May 30, 1972

[54] SERVICE AND PARKING BRAKE ARRANGEMENT FOR TRAILER VEHICLES

[72] Inventor: Hans O. Schroter, 8 Munchen 22, Robert-Koch-Strasse 18, Munchen, Germany

[22] Filed: Nov. 25, 1970

[21] Appl. No.: 92,652

[30] Foreign Application Priority Data

Nov. 27, 1969 Germany ................ P 19 59 633.9

[52] U.S. Cl. .................................................. 188/112
[51] Int. Cl. ................................................... B60t 7/20
[58] Field of Search ........................ 118/2 A, 106 R, 112

[56] References Cited

UNITED STATES PATENTS 1,903,138   3/1933   Rockwell ........................ 188/106 R
2,144,011   1/1939   Collings ............................... 188/24

Primary Examiner—Evon C. Blunk
Assistant Examiner—I. Kenneth Silverman
Attorney—Edmund M. Jaskiewicz

[57] ABSTRACT

A wheel brake mechanism on a trailer has a brake shoe support mounted for limited tangential movement with respect to the wheel axle but restrained against movement during forward movement of the trailer vehicle by an abutment mounted on the frame of the vehicle. An auxiliary rod linkage interconnects the brake shoe support to the service rod linkage which is operated during ordinary or service braking applications to apply an actuating force to the brake shoes of the trailer wheel brake mechanism. During rearward movement of the trailer vehicle the brake shoe support may move sufficiently to cause the auxiliary rod linkage to exert a counteracting force on the service rod linkage. A parking brake comprising a pivotally mounted operating lever has a locking lever thereon which locks the auxiliary rod linkage against movement when the operating lever is moved in the braking direction but which is unlocked from the auxiliary rod linkage when the operating lever is in the release position.

6 Claims, 1 Drawing Figure

Patented May 30, 1972 3,666,060
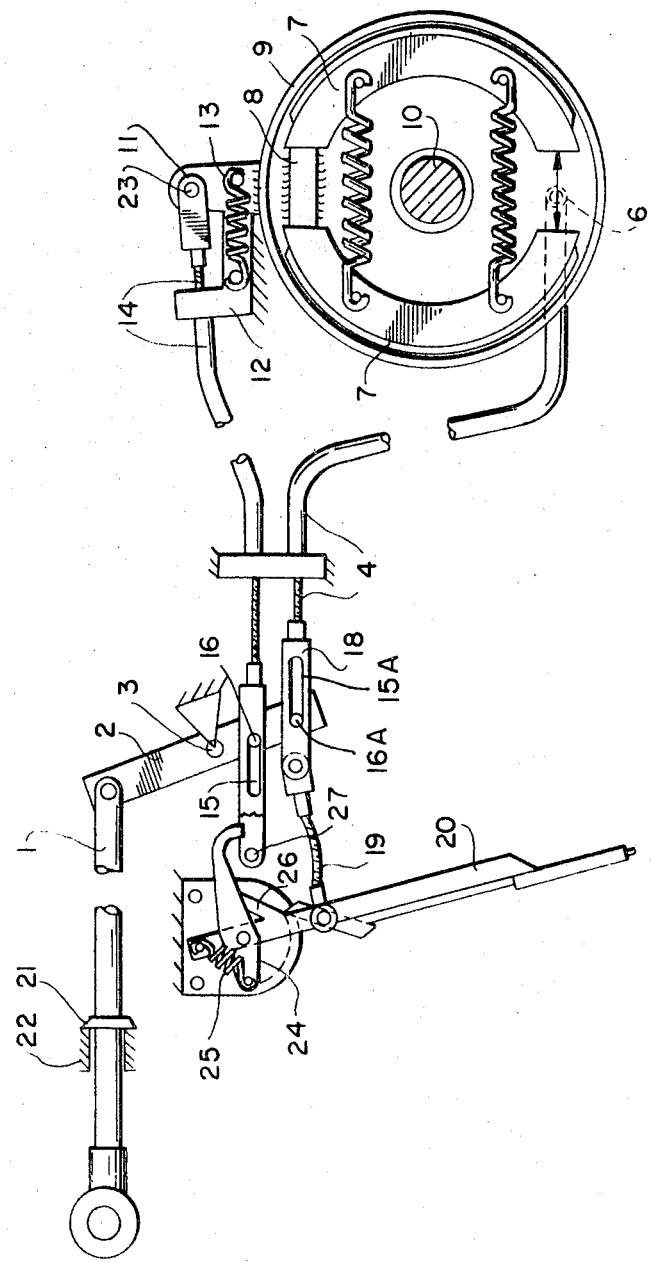
INVENTOR
HANS O. SCHRÖTER
BY Edmund M. Jaskiewicz
ATTORNEY

SERVICE AND PARKING BRAKE ARRANGEMENT FOR TRAILER VEHICLES

The present invention relates to a braking system for trailer vehicles, more particularly, to a service and parking brake apparatus which eliminates any necessity for locking the service brake mechanism during rearward movement of the trailer vehicle.

Trailer vehicles which are attached to the tractor trucks are generally provided with a service and parking brake apparatus which includes a brake rod linkage for transmitting an actuating force mechanically or hydraulically to the wheel brake mechanism. The apparatus generally comprises an additional rod linkage which is actuated by a hand brake. Such service brakes for trailer vehicles have the disadvantage that during rearward movement of the trailer vehicle under the action of the tractor truck the trailer wheel brake becomes tightened because of the pushing force exerted by the tractor truck and further rearward movement of the trailer vehicle becomes very difficult or even impossible. To overcome this disadvantage service brakes have been generally provided with a locking device that is actuated prior to the rearward movement of the tractor truck and the automatic tightening of the trailer brake during rearward movement of the trailer thus prevented. For safety purposes any unintentional locking of the service brake must be avoided since this would prevent braking of the trailer. Since the locking device must fulfill these several qualifications the installation of such a locking device becomes expensive. Further, such a locking device may have the tendency to release itself upon any relative angular movement between the tractor truck and the trailer during rearward movement of the tractor-trailer unit. In addition, where the tractor truck is operated by a single operator it becomes extremely difficult and expensive to arrange the locking device in such a manner that it can be readily operated at any time by the operator when he is seated in operating position in the truck cab.

It is therefore the principal object of the present invention to provide a novel and improved service and parking brake arrangement for trailer vehicles.

It is another object of the present invention to eliminate a rearward locking device on the service brake of a trailer vehicle without affecting adversely the braking characteristics of the trailer under any circumstances that may occur.

It is a further object of the present invention to provide a service and parking brake arrangement for trailer vehicles wherein any tendency of the brakes to become tightened upon rearward movement of the trailer vehicle is eliminated while not detracting from the braking characteristics of the trailer.

According to one aspect of the present invention a service and parking brake apparatus for trailer vehicles may comprise a wheel brake mechanism including brake shows which may be actuated by hydraulic or mechanical means. Rod linkage means are provided for applying an actuating force to the brake shoe actuating means and there is also provided a mechanical parking brake including a pivotally mounted operating lever for applying an actuating force to the mechanical or hydraulic brake shoe actuating means. A brake shoe support which supports the brake shoes of the wheel brake mechanism is mounted for limited tangential movement with respect to the axle of the wheel on at least one wheel brake mechanism with the movement of this brake shoe support means during forward movement of the trailer vehicle being restrained by abutment means mounted on the frame of the trailer vehicle. An auxiliary rod linkage interconnects the brake shoe supporting means to the service rod linkage so that the reaction force of the brake shoes upon actuation of the wheel brake mechanism during rearward travel of the trailer vehicle is transmitted to the service rod linkage means to counteract the actuating force of this rod linkage. The parking brake operating lever is provided with a coaxially mounted locking lever which blocks the auxiliary rod linkage upon movement of the operating lever in the braking direction so that the reaction force of the brake shoes on the auxiliary linkage is transmitted to the frame of the trailer vehicle.

Other objects and advantages of the present invention will be apparent from the accompanying description when taken in conjunction with the following drawing which illustrates schematicly the service brake rod linkage and the hand brake lever interconnected with the trailer wheel brake mechanism according to the present invention.

With reference to the drawing a specific embodiment of the present invention will be described in detail.

An overrunning or service rod linkage 1 has one end pivotally connected to an end of a shift lever 2 which is pivotally mounted at 3 to a fixed point on the frame of a trailer vehicle. The other end of lever 2 is connected by a flexible cable and tubular cover 4 to a suitable mechanism 6 for spreading or opening the ends of brake shoes 7. When the rod linkage 1 is shifted in the braking direction, or to the right as viewed in the drawing, the brake shoes 7 will be urged outwardly against a brake drum (not shown in the drawings) which is firmly attached in the usual manner to a wheel hub similarly not shown in the drawings. The ends of brake shoes 7 opposite the spreading mechanism 6 are supported against a brake shoe support 8 which is fixedly mounted on a disk 9 supported for limited tangential movement on a wheel axle or shaft 10. The wheel hub which is not shown in the drawing and the brake drum also not shown similarly rotate about the axle 10.

The disk 9 is provided with a lever-shaped extension 11 which is pivotally connected at 23 by a flexible cable within a sheath or tubing 14 as an auxiliary rod linkage. The other end of the cable and cover assembly 14 is connected to the shift lever 2 of the service rod linkage by means of a fork whose legs are provided with a slot 15 and which slidably receives a bolt or pin 16 which is mounted on the lever 2. The extended arms of the fork having slot 15 have a pin 27 positioned across the end thereof.

An abutment 12 is fixed on the undercarriage or frame of the trailer vehicle and the extension 11 is urged into engagement with the abutment 12 by means of a pretensioned tension spring 13.

An abutment 21 is fixed upon the service rod linkage 1 to abut against a guide 22 which is also attached to the frame of the trailer vehicle. The abutment 21 is positioned against guide 22 when the brake is in the released position as shown in the drawing.

The parking brake mechanism comprises a hand operated lever 20 which is pivotally mounted on the frame and is connected to a fork 18 by means of a cable 19. The cable and sheath assembly 4 is connected to the lever 2 by means of the fork 18 which is similarly provided with a slot 15A within which is slideably received a pin 16A mounted on the lever 2. The slot and pin connection of fork 18 to the lever 2 insures that cable 4 can be moved at any time by hand brake lever 20 when this lever is pivoted in the braking direction, independently of the position of the service rod linkage 1.

A locking lever 24 is pivotally mounted coaxially with the hand brake lever 20 and is urged by a pre-tension spring 25 against a stop 26 on the brake lever 20. When the hand brake lever 20 is in the release position as shown in the drawing the hook-shaped free end of locking lever 24 is positioned in the vicinity of pin 27 but does not interfere with any movement of the pin 27 to the right as viewed in the drawing.

With respect to the operation of the service and parking brake apparatus as described above it is considered that when the tractor truck moves in the forward direction the trailer will move to the left as viewed in the drawing. If the trailer vehicle is braked or retarded during this forward travel of the unit, the rod linkage 1 will move in the braking direction which is to the right as viewed in the drawing. As a result, the spreading mechanism 6 will become effective under the force exerted by the lever 2 and cable 4 so that the brake shoes 7 will engage the brake drum.

In the same manner, the brake shoes 7 can be actuated into engagement with the brake drum by means of the hand brake lever 20 which is pivoted toward the left as viewed in the drawing and whose movement is independent of the service or overrunning brake mechanism.

As a result of this braking effect, during forward travel of the unit or as the unit moves to the left in the drawing, the extension 11 will remain firmly positioned against the abutment 12. The brake shoes 7 will maintain friction contact with the wheel via the brake drum which with the wheel will be rotating in the counterclockwise direction. The supporting or reaction force exerted by extension 11 against the stationary abutment 12 will thus be increased.

When the trailer vehicle is pushed backward by the tractor truck or moved to the right as viewed in the drawing a braking effect may be introduced initially in the same manner by applying rod linkage 1 as described above. Since the trailer vehicle will now be moving to the right as viewed in the drawing its wheels will rotate in the clock wise direction and the extension 11 will be moved away from stationary abutment 12. The lost motion device comprising the slot 15 and sliding pin 16 makes possible a free pivoting lever 2 in the braking direction as in the case of forward travel of the vehicle. However, when the trailer vehicle is travelling rearwardly, the pin 16 will abut left hand end of slot 15 so that the reaction force of brake shoes 7 acting on brake shoe support 8 will now exert a force on the rod linkage 1 by means of the auxiliary rod linkage 14 with this force counteracting or being opposite to the pushing force acting on the rod linkage 1. The lever advantage or ratio of lever 2 is such that the braking effect of the trailer is sufficiently reduced so that the trailer can be pushed rearwardly by the tractor truck.

Should the trailer vehicle be braked after being uncoupled from the tractor, with this braking generally being exclusively by means of the hand brake lever 20, the above-described effect occurring during braking while the vehicle is moving rearwardly is eliminated. The brake lever 20 is pivoted in the braking direction which is clockwise so that the hooked end of locking lever 24 will lockingly engage pin 27 to lock the auxiliary rod linkage 14 against any movement. As a result, the reaction force of brake shoes 7 occurring during rearward travel of the vehicle is transmitted to the frame of the trailer. The parking brake mechanism may be operated by some other suitable arrangement other than the hand brake lever as described above. The parking brake may be operated by a downward pivoting of the tractor hitch shaft such as would occur when a trailer having several axles is uncoupled. In any event, movement of the auxiliary rod linkage comprising the cable assembly 14 is locked as soon as any pivoting movement of the parking cable actuating mechanism is initiated.

The braking force active on the circumference of the brake wheels of a trailer is generally at least four to seven times greater than the actuating force exerted by the rod linkage 1. As a result, the force exerted on the rod linkage 1 during a rearward pushing of the trailer by the tractor truck is subjected to a counterforce which is many times greater than the braking force so that the brake shoes 7 can be pressed against the brake drums with a relatively low force. In most cases a satisfactory operation of the brake system as described above will be achieved if brake shoe support 8 is mounted on a single wheel of the trailer vehicle.

It is therefore apparent that the service and parking brake apparatus of the present invention requires no locking device which must be activated during a rearward movement of the trailer since the rearward pushing by the tractor truck exerts so small a braking effect on the trailer that there is virtually no interference with this rearward pushing movement. Further, the trailer vehicle can be subjected to braking action as may be desired, even during rearward movement of the trailer vehicle by means of a parking hand brake lever whose effect on the wheel brakes is not impaired in any way. While the operation of the trailer braking system is considerably simplified the present invention provides unrestricted braking capacity for the trailer in all possible operational situations as required by high safety standards.

It is understood that this invention is susceptible to modification in order to adapt it to different usages and conditions and, accordingly, it is desired to comprehend such modifications within the invention as may fall within the scope of the appended claims.

What is claimed is:

1. In a service and parking brake apparatus for trailer vehicles, the combination of a wheel brake mechanism including brake shoes, means operatively connected to said wheel brake mechanism for actuating said brake shoes, rod linkage means for applying an actuating force to said brake actuating means, mechanical parking brake means including an operating lever for applying an actuating force to said brake actuating means, brake shoe support means mounted for limited tangential movement with respect to the axle of the wheel, means on the frame of the trailer vehicle and engageable by said brake shoe support means for limiting the movement of said support means during forward movement of the trailer vehicle, auxiliary rod linkage interconnecting said brake shoe support means to said rod linkage means so that the reaction force of the brake shoes upon actuation of the wheel brake mechanism during rearward travel of the trailer vehicle is transmitted to said rod linkage means to counteract the actuating force of said rod linkage means, and means on said parking brake operating lever for locking said auxiliary rod linkage so that the reaction force of the brake shoes on said auxiliary rod linkage is transmitted to the frame of the trailer vehicle.

2. In a service and parking brake apparatus as claimed in claim 1 and comprising an extension on said brake shoe support means, said movement limiting means comprising an abutment engageable by said extension.

3. In a service and parking brake apparatus as claimed in claim 2 and comprising resilient means urging said extension into engagement with said abutment.

4. In a service and parking brake apparatus as claimed in claim 2 and comprising a disk mounted for pivotable movement about the wheel axle, said brake shoe support means and said extension mounted on said disk.

5. In a service and parking brake apparatus as claimed in claim 1 wherein said locking means comprises a locking lever mounted coaxially with said parking brake operating lever, stop means on said operating lever engageable by said locking lever, spring means urging said locking lever against said stop means when the operating lever is in the release position, said locking lever locking said auxiliary rod linkage against movement when said operating lever is pivoted in the braking direction.

6. In a service and parking brake apparatus as claimed in claim 1 and comprising lost motion means corresponding to the distance of travel of the rod linkage means and mounted between said auxiliary rod linkage and said rod linkage means.

* * * * *